Sept. 11, 1934.     G. W. ROSENBERGER     1,973,106
MEASURING INSTRUMENT
Filed March 24, 1932

WITNESSES:
R. S. Williams
A. A. Steinmiller

INVENTOR
George W. Rosenberger
BY
ATTORNEY

Patented Sept. 11, 1934

1,973,106

UNITED STATES PATENT OFFICE 1,973,106

MEASURING INSTRUMENT

George W. Rosenberger, Newark, N. J., assignor to Westinghouse Electric & Manufacturing Company, a corporation of Pennsylvania Application March 24, 1932, Serial No. 600,857

3 Claims. (Cl. 185—38)

My invention relates to measuring instruments and particularly to means for totalizing the quantities measured by a plurality of instruments.

One object of my invention is to obtain the sum of the readings of several meters without imposing added load on the individual meters.

Another object of my invention is to eliminate time lag between a plurality of meter elements and a totalizing register which would ordinarily be caused by inertia and added load where the meters drive the register.

Another object of my invention is to provide a novel escapement mechanism for a totalizing instrument or similar device.

Another object of my invention is to combine a plurality of prime mover or control elements, a differential gear mechanism, a torque motor and a controlled member in a manner not heretofore combined, so far as I am aware.

In totalizing instruments, it has heretofore been usual to relay the readings or movements of several instruments to a totalizing register by means including electrical contacts and other devices. It has also been usual to combine the readings of several instruments by causing them to drive a totalizing register through a differential gear mechanism.

It has further been suggested that a torque motor be employed to relieve a single meter of the load necessary to operate an indicating member or register.

However, it has not been suggested, so far as I am aware, that a torque motor may be employed for operating a totalizing register for several meters in combination with a differential gear mechanism operated by the several meters for controlling the torque motor.

It is my object to simplify a totalizing instrument and eliminate electrical contacts, magnets and other complicated and expensive parts by providing the previously mentioned combination of a torque motor, a differential gear mechanism and a plurality of individual meters, to thereby effect a compact structure of new and useful character.

Accordingly, in practicing my invention, I so combine the elements, above-mentioned, with novel escapement mechanism in a manner not heretofore suggested so far as I am aware, as to obtain an entirely new instrumentality in this field.

Figure 1:
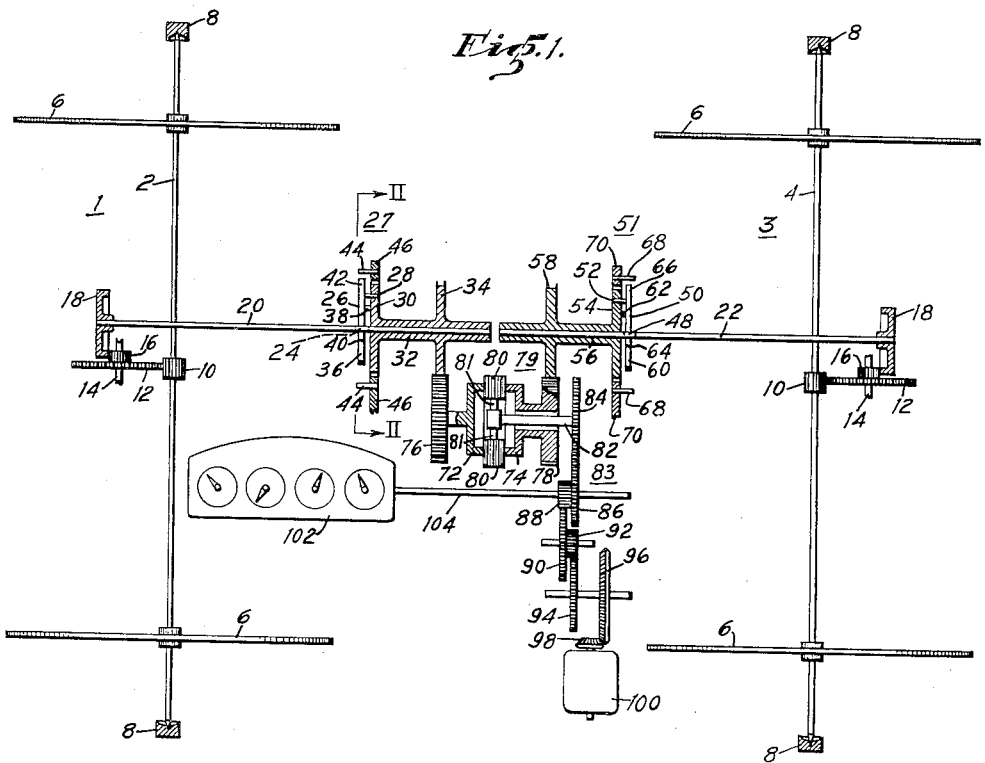
Figure 2:
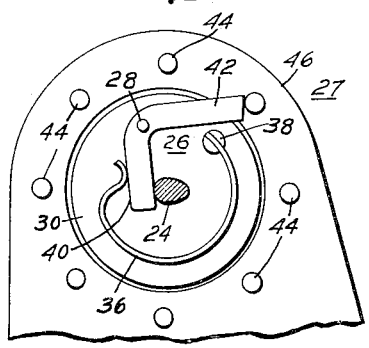

Figure 1, of the accompanying drawing, is a diagrammatic view, partially in section and partially in elevation, of those parts of an instrument embodying my invention as are necessary for a full understanding thereof; other parts of well known character and operation being omitted for clearness and simplicity, and Figure 2 is an enlarged view, taken along the line II—II of Fig. 1 showing the details of the escapement mechanism employed in my invention.

Referring to Fig. 1, a plurality of metering devices 1 and 3 for measuring any desired quantity, such as watthours, are provided with suitable actuating mechanisms such, for example, as one or more armature disks 6 adapted to rotate on suitable spindles 2 and 4, respectively. The spindles 2 and 4 are supported for rotation in stationary bearings 8 and each spindle carries a pinion gear 10 for operatively engaging a gear wheel 12 secured to a corresponding shaft 14. Each of the shafts 14 also carries a pinion gear 16 for operatively engaging another gear wheel, such as the crown-gear wheel 18, on one of two independently rotatable shafts 20 and 22. The shafts 20 and 22 which are suitably supported by bearing members not shown, are thus rotatable in accordance with the rotation of the meter spindles 2 and 4 respectively. Suitable recording registers or dials may or may not be employed in connection with each of the spindles 2 and 4, as desired.

As shown in greater detail in Fig. 2, the shaft 20 is provided with a cam 24, which has an eccentric contour, substantially of egg-shape, with respect to the axis of the shaft for operatively engaging and periodically actuating a pawl, such as the bell-crank lever 26, of an escapement device 27.

The cam 24 may be a separate member suitably secured to the shaft 20 or it may be an integral part of the shaft as shown. Furthermore, it may be of any suitable size, either having portions thereof projecting radially beyond the periphery of the shaft or, as shown, having all portions within the cross-sectional area of the shaft.

The pawl 26 is pivotally mounted by means of a pin 28 on a disk 30 which is provided with a suitable hub or sleeve 32 for rotatably mounting the disk on the shaft 20. A gear wheel 34, adapted to rotate with the disk 30, is suitably secured thereto to the sleeve 32, as shown.

The pawl or bell-crank lever 26 comprises an inwardly extending arm 40 and an outwardly extending arm 42. A biasing means, such as a spring 36, maintains the arm 40 in constant engagement with the cam 24, which causes the arm 40 to remain biased to an inner position shown in Fig. 2 except for a momentary actuation thereof to an outer position against the force of the spring 36 whenever the portion of the cam most remote from the axis of the shaft 20 engages it.

A stationary supporting base or plate 46 which is suitably disposed adjacent the disk 30, preferably by adapting it to closely surround the periphery of the disk in the manner shown, is provided with a plurality of pins or stop members 44 suitably secured thereto and arranged in a circular path in spaced angular relation with equal distances therebetween. The pins project into the plane of the pawl 26 and are engageable by the end of the arm 42 of the pawl as long as the arm 40 is biased to the inner position shown in Fig. 2, to prevent rotation of the disk 30.

Whenever the arm 40 of the pawl 26 is momentarily actuated by the cam 24 to its outer position, as previously described, the end of the arm 42 is caused to move inwardly toward the axis of the shaft 20 and to thereby disengage the stop member 44 with which it was in engagement.

The disk 30 is continuously biased in the proper direction, by means such as a torque motor 100, in a manner which will be hereinafter described, so that whenever the pawl 26 disengages or is released from a stop member 44, the disk 30 moves in the direction in which it is biased. Due to the fact that the arm 40 is only momentarily in its outer position, the rotational speed of the cam 24 and its contour being such as to effect that result, the end of the arm 42 is returned to its outer position almost immediately after its release from a stop member 44. Thus the arm 42 engages the next stop member 44 in the direction of rotative bias of the disk 30 and further movement of the disk 30 beyond this position is prevented until the cam again releases the pawl from engagement with that stop member 44.

It will be clear, therefore, that upon continued rotation of the shaft 20, all of the stop members 44 are successively engaged and disengaged to effect rotation of the disk 30 through complete revolutions by an intermittent motion similar to that of a cog-wheel of well-known escapement devices.

The number of revolutions of the shaft 20, it will be observed, bears a certain definite ratio to the number of revolutions of the disk 30, and this ratio may, of course, be increased or decreased by increasing or decreasing, respectively, the number of the stop members 44 employed. It will be observed also that the ratio between the number of revolutions of the shaft 20 and the number of revolutions of the disk 30 effected thereby is different, although the speed of the shaft 20 is constant, depending upon whether the disk 30 is biased to follow the shaft in its direction of rotation or to rotate counter to it. It should be understood that if the disk 30 is biased to follow the shaft, the release of the pawl 26 enables the disk 30 to follow the shaft 20, in its direction of rotation, an angular distance corresponding to the angular distance between successive stop members 44. Thus it is necessary for the cam 24 to rotate through one revolution and a fraction thereof corresponding to the angular distance between successive stop members, during the interval between successive releases of the pawl 26 from the stop members. In other words, the shaft 20 rotates through a number of revolutions which is one greater than the number of stop members 44 employed, for each revolution of the disk 30. For example, if the number of stop members 44 employed is eight, as in the illustrated embodiment, it is necessary for the shaft to rotate through nine revolutions to effect one revolution of the disk 30.

On the other hand, if the disk 30 opposes the direction of rotation of the shaft 20, that is moves counter to the direction of movement of the shaft upon the release of the pawl 26, the cam 24 need only move through a fraction of a revolution corresponding to one revolution minus the angular distance separating successive stop members 44, between successive releases of the pawl. In other words, the shaft rotates a number of times which is one less than the number of stop members in order to effect one revolution of the disk 30. For example, if the number of stop members employed is eight, as in the illustrated embodiment, the shaft rotates through seven complete revolutions to effect one revolution of the disk 30.

An escapement mechanism 51 corresponding in structure to that of the escapement mechanism 27, is provided for the purpose of functioning in a similar manner with respect to the shaft 22. It comprises briefly, the cam 48 on the shaft 22, the pawl 50 pivotally mounted on a disk 54 by a pin 52, the disk 54 having a hub or sleeve 56 and being coaxially secured to a gear wheel 58, a spring 60 secured to the disk 54 by a pin 62, and a plurality of stop members 68 mounted on a stationary base 70 in circular spaced arrangement corresponding to that of stop members 44, an inner arm 64 of the pawl 50 being biased into engagement with the cam 48 by the spring 60 and an outer arm 66 of the pawl 50 being engageable with the stop members 68 when the inner arm 64 is biased to its inner position.

The two disks 30 and 54 are rotatively biased in any suitable manner by a common means, such as the torque motor 100, through the medium of a differential gear mechanism 79 and a train of gears 83. Obviously, the direction of biased movement must be simultaneously similar for both disks, that is, either in the same direction as, or counter to, that of the direction of rotation of the shafts with which they are associated.

The differential gear mechanism 79 may be of any suitable character, but for purposes of illustration, the embodiment shown in Fig. 1 comprises a pair of spaced separately rotatable crown-gear wheels 72 and 74 to which are coaxially secured or connected for rotation therewith, gear wheels 76 and 78, respectively. The gear wheels 76 and 78 operatively engage the gear wheels 34 and 58 secured to the disks 30 and 54, respectively, and therefore a rotation of gear wheel 76 effects the rotation of disk 30 while a rotation of the gear wheel 78 effects the rotation of disk 54, when the disks are free to move in accordance with the control exercised thereover by the escapement mechanisms 27 and 51.

A plurality of differential pinion gears 80 are employed in well known manner, for operatively engaging simultaneously on opposite ends of the diameters thereof, the two gear wheels 72 and 74 and they are rotatably mounted on stub shafts or pins 81 rigidly secured to or integral with the end of a shaft 82, in perpendicular relation with respect to the axis of the shaft 82. The gear wheel 74 is provided with a suitable hub and bearing for supporting the shaft 82 and permitting it to extend therethrough and project out of the differential gear mechanism.

A gear wheel 84, secured to the end of the shaft 82 which projects out of the differential gear mechanism, is operatively connected to a pinion gear, such as the bevel-type pinion gear 98, on the shaft of the torque motor 100 by means of the intervening train of gears 83 including the gear wheels 86, 90 and 94, the pinion gears 88 and 92, and the bevel gear wheel 96.

The motor 100, which is continuously energized to exert a torque, is, therefore, adapted to rotate the gear wheel 84 and by means of the differential gear mechanism 79 it is also adapted to separately or simultaneously rotate the disks 30 and 54 in accordance with the extent of movement permitted by their respectively associated escapement mechanisms.

A suitable totalizing register 102 is provided and it is adapted to be actuated in accordance with the extent of movement of the torque motor 100, which movement is in turn determined by the extent of movement of the disks 30 and 54 either separately or in combination.

For purposes of illustration, the register 102 is shown as being actuated by the rotation of a shaft 104 to which the pinion gear 88 and gear wheel 86 of the train of gears previously mentioned are secured.

It will thus be clear from the foregoing description, that when the pawl 26 on the disk 30 and the pawl 50 on the disk 54 engage one of the stops 44 and 68 respectively, the entire system of gear wheels and pinion gears is locked against movement and that, therefore, no movement of the torque motor 100 can occur. Obviously, such is the case because the differential gears 80 are locked in position between gear wheels 72 and 74 which are in turn locked in position by the escapement mechanisms 27 and 51 respectively. Under such circumstances as above described, the register 102 is not and cannot be actuated.

Assuming that only one of the meter spindles, for example, the spindle 2 rotates, the shaft 20 is correspondingly rotated and the cam 24 thereon causes the pawl 26 to be released periodically, as above described, from engagement with one of the stops 44 and reengaged with the next stop. A step-by-step angular rotational movement of the disk 30 is thus effected, each of the steps being equal in magnitude to the angular distance between the stop released and the stop next engaged by the pawl 26.

The release of the disk 30 from a locked position effects the unlocking of the gear wheel 72 and thus the motor 100, which, it will be remembered, is exerting a continuous torque in the system, is freed for rotation to the extent permitted by the escapement mechanism 27, due to the fact that the pinion gears 80 may rotatively move around the gear wheel 74 which is stationary, the movement of the pinion gears being permitted by the gear wheel 72 which is free to rotate in accordance with the movement of the pinion gears. Obviously, therefore, the torque motor 100 rotates in accordance with, that is, in a predetermined ratio to, the rotation of the meter spindle 2 to cause the shaft 104 to rotate correspondingly and thereby effect the actuation of the register 102 which suitably and accurately records the same increment of measurement as does the metering device 1.

In a similar manner, if only the meter spindle 4 rotates and the meter spindle 2 is stationary, the shaft 22 is correspondingly rotated and the cam 48 thereon effects periodically the release of the pawl 50 of the escapement mechanism 51. A step-by-step angular rotational movement of the disk 54 is thus effected because the gear wheel 74 is freed for rotation and the motor 100, exerting a continuous torque to rotate the pinion gears 80, causes the gear wheel 74 to rotate, which in turn effects the rotation of the disk 54.

It will thus be seen that the disks 30 and 54 are continuously biased toward one direction of movement thereof by the motor 100 through the differential gear mechanism 79. As described above, any rotation of the torque motor 100 effects a corresponding rotation of the shaft 104 and thus when only the meter spindle 4 is rotating, the register 102 records the increment of measurement corresponding to that measured only by the metering device 3.

If both of the meter spindles 2 and 4 are rotating at the same time, a rotational movement of the shaft 82 supporting the pinion gears 80 is inherently effected in accordance with the sum of movements of the disks 30 and 54. Obviously, if the meter spindles 2 and 4 are rotating at different rates of speed the cams 24 and 48 on the shafts 20 and 22 respectively, will not release the pawls of their respectively associated escapement mechanisms 27 and 51 at the same time and, therefore, the rotation of the torque motor 100 is permitted by the release of either one or the other of the escapement mechanisms 27 and 51 at different times, the register 102 integrating or totalizing each of the respective movements permitted. It is conceivable, although the possibility is very remote, that the meter spindles 2 and 4 might be operating at exactly the same rotational speeds and that the cams 24 and 48 on the shafts 20 and 22 respectively might effect the release of the pawls of their respectively associated escapement mechanisms 27 and 51 at the same time. In such case, the rotational movement of the shaft 82 supporting the pinion gears 80 mechanically integrates the separate movements of the two disks 30 and 54 and a rotation of the motor 100 results which is in accordance with the sum of the movements of the disks 30 and 54.

It will thus be seen that the register 102 is actuated to record the sum of the separate movements of the spindles 2 and 4, and is therefore actuated to record an increment of measurement whether either one or the other of the metering devices 1 and 3 or both thereof are actuated.

It will be understood that due to the fact that the mass of the disks 30 and 54 and their associated gear wheels 34 and 58 is very small and that due to the relatively long leverage arms 40 and 64 between the contact surfaces of the cams 24 and 48 and the pins 28 and 52, as well as for the reason that the springs 36 and 60 exert delicate forces on the inner arms 40 and 64, the shafts 20 and 22 are required to supply only an infinitesimal amount of energy for actuating the pawls 26 and 50 of the escapement mechanisms. Once the escapement mechanisms are operated the torque motor supplies all of the energy for moving the various mechanical parts previously described and for actuating the register 102.

The advantage secured by my invention is, therefore, that an integrated record of the measurements of a plurality of separate measuring devices is obtained without imposing an appreciable added load on the actuated elements, such as the spindles or rotating elements of the measuring devices. Furthermore, a highly sensitive trigger release mechanism is provided whereby a substantially instantaneous response of a totalizing or integrating register is obtained without any appreciable time lag between the measurement on the separate metering devices and that on the integrating or totalizing register.

The device comprising my invention is comparatively simple in construction and operation and possesses a high order of accuracy. It is readily adapted for commercial uses on a large scale, without any greater precision of workmanship than is required for ordinary similar meters not embodying the invention and is, in general, a marked advance in the art to which it relates.

Although I have specifically described a device for integrating the records of only two metering devices, it should be understood that the same principle of operation may be employed to integrate the readings of any number of metering devices. For example, if four metering devices are employed, the readings of each pair may be integrated by separate differential gear mechanisms and the integrated movement of each of the pairs may be further integrated by another differential gear mechanism driven through a train of gears by a torque motor. It should be understood, therefore, that my invention is adapted to effect the integration of the records of any number of metering devices.

It should thus be seen that I have devised means for integrating or totalizing the separate measurements of a plurality of metering devices without imposing an appreciable added load to any of the individual metering devices.

It should be seen also that I have provided a novel escapement mechanism capable of actuation by the rotating element of a metering device without requiring the expenditure of an appreciable amount of energy thereby.

It should be seen further that I have provided a novel combination including a plurality of metering devices and a totalizing register for the several metering devices, which register is operated by a torque motor controlled by the separate metering devices through a differential gear mechanism.

It should be clearly understood also that while I have shown and described a specific embodiment of my invention, various modifications and changes may be made therein without departing from the spirit and scope thereof. I desire, therefore, that no limitations be imposed thereon except such as are necessitated by the scope of the prior art and the scope of the appended claims.

I claim as my invention:

1. In combination, two relatively movable rotatable members, and an escapement mechanism for operatively associating said two members including a stationary stop member, a cam member movable in accordance with one of said rotatable members, a pawl member on said other rotatable member having two angularly disposed arms, one of which is adapted to engage the said stop member and thereby prevent the movement of the said other rotatable member and the other of which is adapted to be engaged by the said cam member to effect the disengagement of the said one arm from the said stop member.

2. In combination, two relatively movable rotatable members, and an escapement mechanism for operatively associating said two members including a plurality of stationary stop members circularly arranged in spaced angular relation, a cam member movable in accordance with one of said rotatable members, a pawl member on said other rotatable member having two angularly disposed arms, one of which is adapted to engage any of the said stop members and thereby prevent the movement of the said other rotatable member and the other of which is adapted to be engaged by the said cam member to effect the disengagement of the said one arm from all of the stop members in succession.

3. In combination, a shaft rotatable in accordance with a quantity to be measured, a rotatable member and means for biasing it for rotation, and an escapement between said shaft and biased rotatable member for permitting limited rotation of the latter in accordance with the rotation of said shaft; said escapement comprising a stationary stop member, a pawl mounted on said rotatable member normally in engagement with said stop member, and a cam operated in accordance with the rotation of said shaft for momentarily moving said pawl out of engagement with said stop member to permit a limited rotation of said rotatable member.

GEORGE W. ROSENBERGER.